(12) United States Patent
Kern et al.

(10) Patent No.: US 7,313,104 B1
(45) Date of Patent: Dec. 25, 2007

(54) WIRELESS COMPUTER SYSTEM WITH LATENCY MASKING

(75) Inventors: William F. Kern, Palo Alto, CA (US); Stephan Rosner, Campbell, CA (US); Ralf Flemming, Dresden-Radebeul (DE); Stephen T. Novak, Agoura, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 881 days.

(21) Appl. No.: 10/147,413

(22) Filed: May 16, 2002

Related U.S. Application Data

(60) Provisional application No. 60/343,737, filed on Dec. 28, 2001.

(51) Int. Cl.
*H04B 7/00* (2006.01)
*H04L 12/28* (2006.01)
*H04L 12/56* (2006.01)
*H04J 3/24* (2006.01)

(52) U.S. Cl. .................. 370/310; 370/412; 370/474

(58) Field of Classification Search ............ None
See application file for complete search history.

(56) References Cited

U.S. PATENT DOCUMENTS

| | | | | |
|---|---|---|---|---|
| 5,404,450 A | * | 4/1995 | Szczepanek et al. | 709/221 |
| 5,434,872 A | * | 7/1995 | Petersen et al. | 714/811 |
| 5,818,852 A | | 10/1998 | Kapoor | |
| 5,872,920 A | * | 2/1999 | Hausman et al. | 709/250 |
| 5,889,772 A | | 3/1999 | Fischer et al. | |
| 6,005,506 A | | 12/1999 | Bazarjani et al. | |
| 6,069,887 A | * | 5/2000 | Geiger et al. | 370/338 |
| 6,097,721 A | | 8/2000 | Goody | |
| 6,263,009 B1 | | 7/2001 | Ramberg et al. | |
| 6,324,387 B1 | | 11/2001 | Kamgar et al. | |
| 6,407,999 B1 | | 6/2002 | Olkkonen et al. | |
| 6,577,609 B2 | | 6/2003 | Sharony | |
| 6,594,266 B1 | | 7/2003 | Kim | |

(Continued)

FOREIGN PATENT DOCUMENTS

| | | |
|---|---|---|
| EP | 886 385 | 9/2004 |
| WO | 01/91331 | 11/2001 |

OTHER PUBLICATIONS

AMD Application note, Wireless LAN DSSS PC Card Reference Design, Apr. 1997. Reference AMD website (www.amd.com) Publication No. 2057 Rev. B.

(Continued)

*Primary Examiner*—Daniel J. Ryman
(74) *Attorney, Agent, or Firm*—Lawrence J. Merkel; Meyertons, Hood, Kivlin, Kowert & Goetzel, P.C.

(57) ABSTRACT

A wireless computer system (30) is formed to have a host section (31) and a wireless hardware section (40). A first portion of a transmission frame is formed in system memory (36) of a host section (31) and a second portion of the transmission frame is formed in the wireless hardware section (40). The wireless hardware section (40) begins transmitting the first transmission frame portion while downloading the second transmission frame portion from the system memory (36) into the wireless hardware section (40). Bus latencies are masked by at least overlapping transmitting the first portion of the transmit frame while downloading the second portion.

14 Claims, 7 Drawing Sheets

U.S. PATENT DOCUMENTS

| | | | |
|---|---|---|---|
| 6,625,157 B2 | 9/2003 | Niu et al. | |
| 6,650,654 B1* | 11/2003 | Batty et al. | 370/445 |
| 6,659,947 B1 | 12/2003 | Carter et al. | |
| 6,693,888 B2 | 2/2004 | Cafarelli et al. | |
| 6,791,989 B1 | 9/2004 | Steinmetz et al. | |
| 6,799,247 B1* | 9/2004 | Batcher | 711/118 |
| 6,829,254 B1 | 12/2004 | Rajahalme et al. | |
| 6,895,255 B1 | 5/2005 | Bridgelall | |
| 6,918,034 B1 | 7/2005 | Sengodan et al. | |
| 6,944,688 B1* | 9/2005 | Batcher | 710/55 |
| 6,973,296 B2 | 12/2005 | Webster et al. | |
| 7,010,579 B1* | 3/2006 | Batcher | 709/217 |
| 7,039,027 B2* | 5/2006 | Bridgelall | 370/329 |
| 7,058,367 B1 | 6/2006 | Luo et al. | |
| 7,149,213 B1 | 12/2006 | Rosner et al. | |
| 2002/0016949 A1 | 2/2002 | Goslin et al. | |
| 2002/0025012 A1 | 2/2002 | Saito et al. | |
| 2002/0080768 A1 | 6/2002 | Garcia-Luna-Aceves et al. | |
| 2002/0089994 A1 | 7/2002 | Leach et al. | |
| 2002/0136183 A1* | 9/2002 | Chen et al. | 370/338 |
| 2003/0161417 A1 | 8/2003 | Kluge et al. | |
| 2003/0169711 A1 | 9/2003 | Borowski et al. | |
| 2004/0228339 A1 | 11/2004 | Gallo et al. | |
| 2005/0089062 A1* | 4/2005 | Zegelin | 370/463 |
| 2005/0128951 A1 | 6/2005 | Chawla et al. | |

OTHER PUBLICATIONS

"Virtues of a DMA-Based MAC Architecture as Implemented by AMD Alchemy™ Solutions AM1771™ Baseband/MAC", White Paper, AMD, Revision: 0, Nov. 2002, pp. 1-16.

Cali, et al., "IEEE 802.11 Wireless LAN: Capacity Analysis and Protocol Enhancement," IEEE, 1998, 8 pages.

Motorola, "Data Sheet" SM56 Ubisurf Software Modems, 2003, 2 pages.

Office Action from U.S. Appl. No. 10/147,425 mailed Jul. 13, 2006.

Office Action from U.S. Appl. No. 10/147,426 mailed May 9, 2006.

Office Action from U.S. Appl. No. 10/147,425, mailed Nov. 13, 2006.

Office Action from U.S. Appl. No. 10/147,425, mailed Mar. 8, 2007.

Office Action from U.S. Appl. No. 10/147,425, mailed Aug. 23, 2007.

* cited by examiner

WIRELESS COMPUTER SYSTEM WITH LATENCY MASKING

BACKGROUND OF THE INVENTION

This application claims priority to previously filed English language provisional application No. 60/343,737 filed on Dec. 28, 2001 entitled Wireless Computer System With Queue And Scheduler, having at least one common inventor.

The present invention relates, in general, to computer systems, and more particularly, to wireless computer systems.

A wireless computer system usually is a computer system that has the capability to utilize wireless communication techniques to provide interconnectivity between a computer and elements within a network such as interconnectivity to another computer, servers, and even wired networks. One example of a wireless computer network is commonly referred to as a wireless local area network (WLAN). WLANs and other wireless computer networks provide computer users mobility and remove the constraint of having a network cable physically attached to a computer. WLANs typically are used to augment wired networks, for example, providing a WLAN coupled to a wired LAN within a building or on a campus. Because of the advantages of a WLAN, they gained strong popularity leading to a rapid expansion of the United States WLAN market. Thus, the most common implementation of a wireless computer network is a WLAN.

Most WLAN's are implemented using the Institute of Electrical and Electronic Engineers (IEEE) specification commonly known as 802.11 (IEEE 802.11 or 802.11) including IEEE 802.11b. The 802.11 specification defines some of the functional aspects of a Medium Access Control layer (MAC) and a Physical layer (PHY) that is unique to a WLAN. The MAC layer is defined to handle all management and control issues relating to mobility and the communications protocol structures, and to be transparent to higher layers of IEEE 802.X protocols. The PHY layer defines protocol structures required to support the wireless medium.

A typical implementation of a computer system incorporating a WLAN, including an 802.11 WLAN, is schematically illustrated in FIG. 1. A computer system 10 includes a host system or host 11 generally delineated by a dashed box. Host 11 has a host processor 12. Host 11 often utilizes a North Bridge controller or North Bridge 13 that controls interactions between processor 12 and critical system resources such as a system memory 15 and a display device such as a graphics display. Host 11 often also includes a South Bridge controller or South Bridge 14 that controls interactions between processor 12 and I/O devices. South Bridge 14 typically has a PCI bus 16 through which most peripherals, including a WLAN module 17, are interfaced to system 11.

WLAN module 17 typically implements the 802.11 MAC and PHY protocols. Most of the 802.11 MAC control functions are performed by a micro-processor 18 utilizing programs stored generally in a ROM 21 or other equivalent storage device. Using the program in ROM 21, processor 18 operates on data stored in WLAN module 17, typically in a RAM 19, to implement the 802.11 MAC control functions. A baseband processor 24 and a radio frequency (RF) broadband front-end or front-end 26 generally implement the PHY requirements of 802.11 including presenting data to and receiving data from processor 18, encoding and decoding data using one of the 802.11 coding schemes, determining channel busy or idle status and presenting the status to processor 18, checking the cyclic redundancy check characters (CRC), and modulating and demodulating the encoded data onto and from the channel at the 802.11 frequencies.

One problem with system 10 and particularly with WLAN module 17 is system partitioning. WLAN module 17 interfaces to host system 11 through PCI Bus 16. Typically, several other peripheral devices in addition to module 17 are also interfaced to host system 11 through PCI Bus 16. The PCI 2.0 standard specifies the protocol and timing in addition to the bus arbitration that different modules that are interfaced to PCI bus 16 must use in order to gain access to PCI Bus 16. For some wireless transmission sequences, the PCI bus latencies may be greater than the time that system 11 requires to store the data into wireless module 17, thus, the system can not provide the data in sufficient time to meet the WLAN protocol. For example, 802.11 can have a receive-transmit sequence that only allows a time period of about ten micro-seconds between receiving a frame and the next transmission time slot. Several transactions across PCI Bus 16 can be required to effect the responsive transmission. System 10 can require up to six microseconds or longer just to gain access to PCI Bus 16. Consequently, in order to minimize the throughput limitations host processor 12 preloads all of the data to be transmitted into WLAN module 17, typically into RAM 19, prior to initiating a transmission. After host processor 12 stores all the data, processor 18 reads the data from RAM 19, prepares all the headers, control, and status fields for the frame as required by the WLAN protocol, and then begins to transmit the frames to baseband processor 24 for transmission over the wireless channel. The partitioning of system 10 requires that all data be transferred into wireless module 17 prior to initiating a transmission.

Another problem with system 10 is costs. Because system 11 preloads all the data to be transmitted into WLAN module 17 prior to initiating a transmission, WLAN module 17 must have sufficient storage to accommodate the data in addition to storage for the programs stored in ROM 21, and must also have working storage in RAM 19 for the programs. A typical module 17 often requires at least one hundred twenty-eight Mega-bytes (128 M bytes) for RAM 19 and can use one hundred twenty-eight Kilo-bytes (128 K bytes) for ROM 21. Some WLAN modules require additional RAM and flash memory in addition to RAM 19 and ROM 21, thereby further increasing costs.

Additionally, the partitioning of system 10 requires a dedicated microprocessor to process information prior to a transmission. The additional micro-processor further increases costs and increases the power dissipation of system 10.

Accordingly, it would be desirable to have a computer system and method that reduces the computer system costs, and that improves the partitioning of the system.

For simplicity and clarity of illustration, elements in the figures are not necessarily to scale, and the same reference numbers in different figures denote the same elements. Additionally, descriptions and details of well known steps, flows, and elements are omitted for simplicity of the description.

DETAILED DESCRIPTION OF THE DRAWINGS

Figure 1:
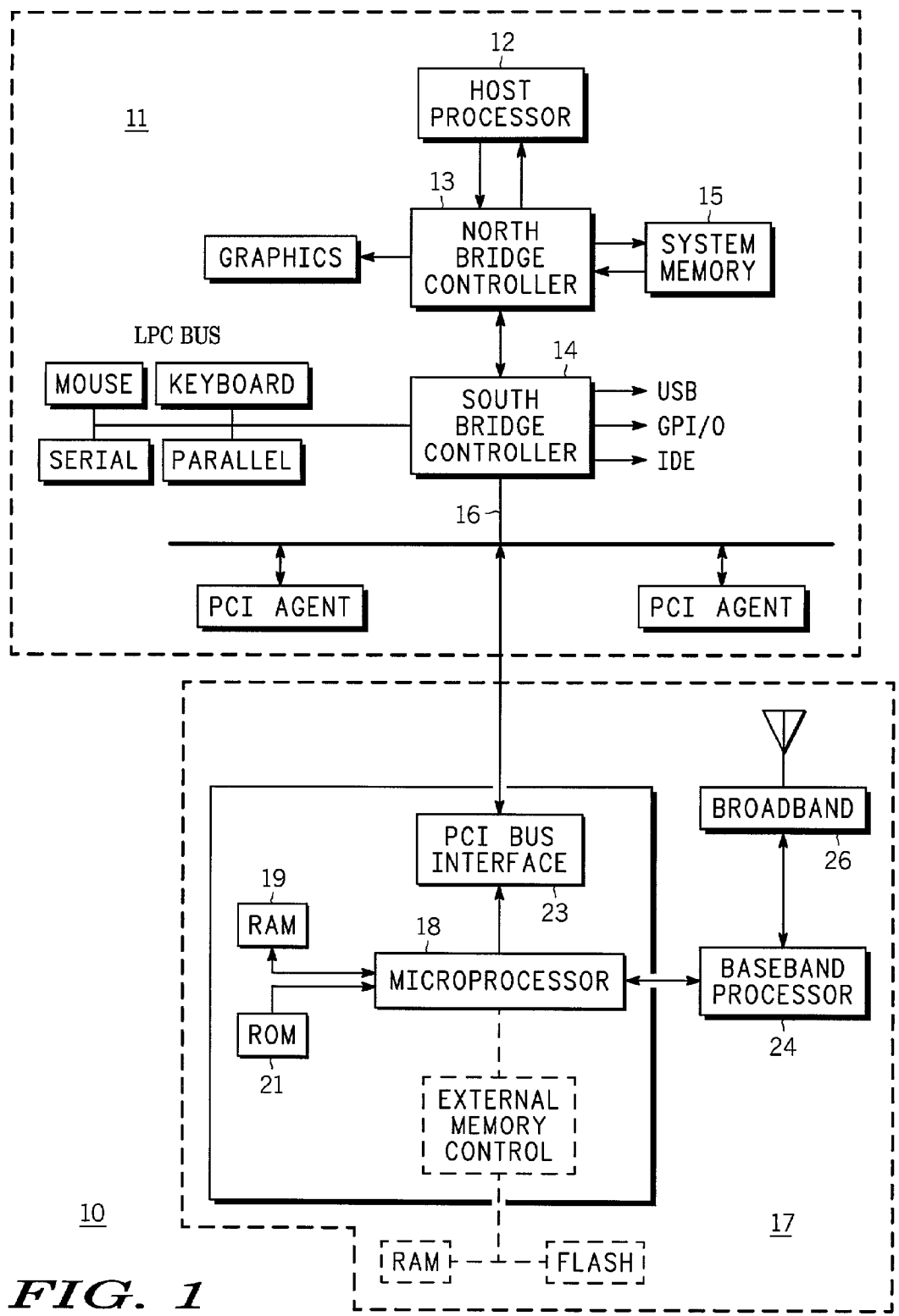
FIG. 1 illustrates a functional schematic of a prior art computer system.
Figure 2:
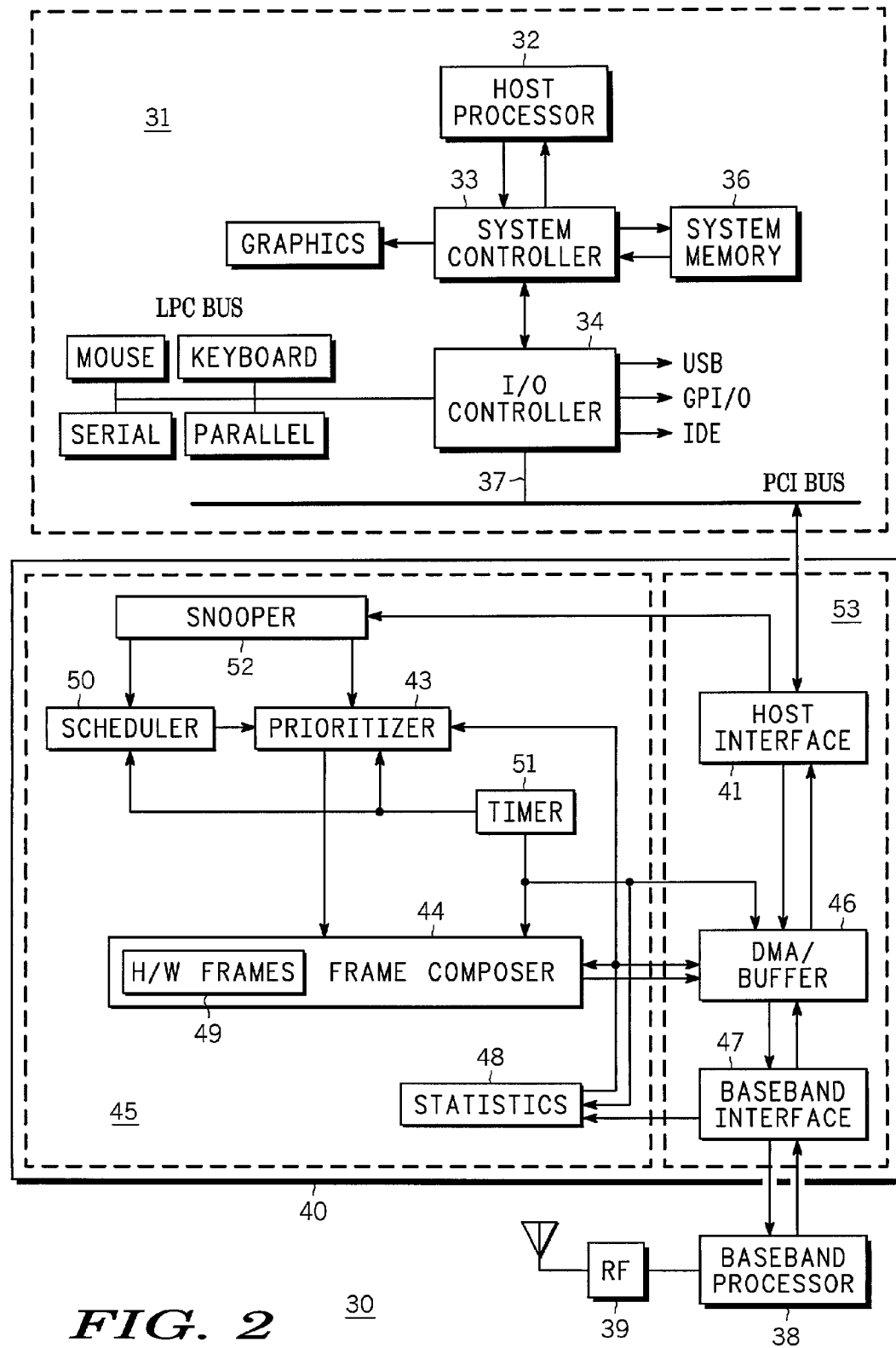
FIG. 2 schematically illustrates a high level functional diagram of an embodiment of a wireless computer system in accordance with the present invention.

FIG. 2 is a system block diagram schematically illustrating functional portions of an embodiment of a wireless computer system 30. As will be seen in the descriptions hereinafter, wireless computer system 30 minimizes the cost of forming a wireless computer system and also improves both the throughput and the system partitioning by utilizing portions of system memory for storing information that is to be transmitted over a wireless channel or wireless network by wireless computer system 30. In order to have the information from system memory available for transmission as required by the protocol, wireless computer system 30 partitions the tasks that are to be performed into different types of tasks and forms frame queues for each type of task, the various task differentiated frame queues are formed in different system areas based on the task. As will be seen hereinafter, the information downloaded has a variable length depending on the task and amount of information. Additionally, wireless computer system 30 overlaps downloading of the transmission information from system memory to a wireless hardware section during the time that the wireless hardware section is transmitting a first portion of the transmission onto the wireless channel. Transmitting the first portion while the second portion is downloading masks bus latencies that are involved in the downloading. Masking the latencies is important is providing system 30 time to download sufficient portions of the transmission information from system memory to permit the process to continue to successful completion.

Figure 3:
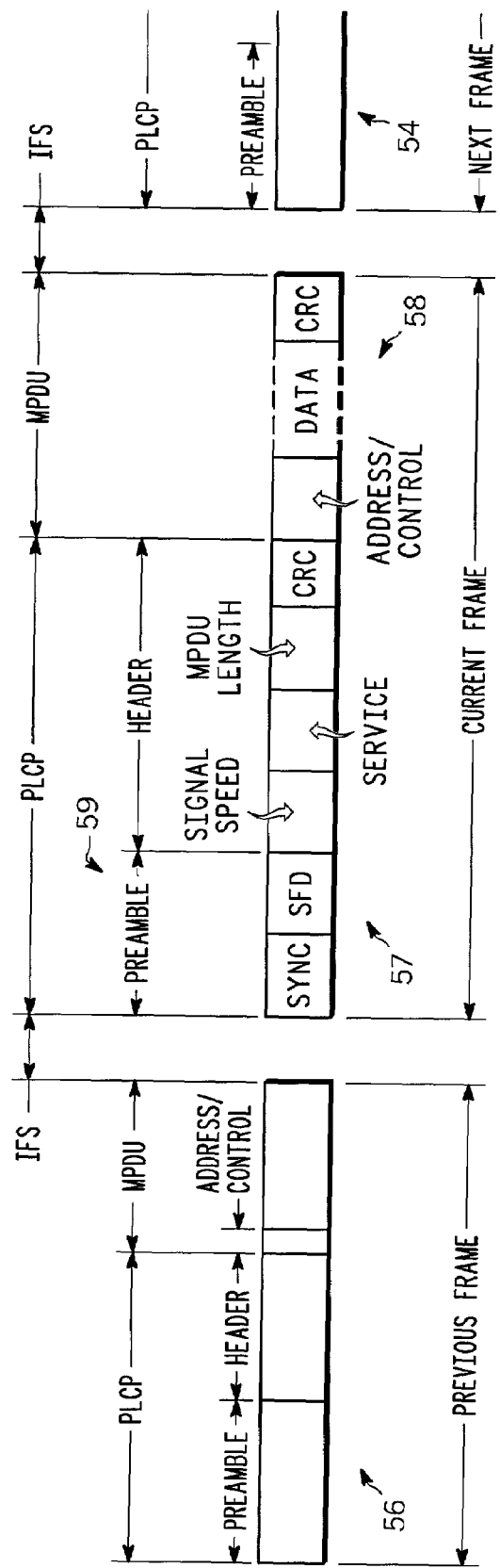
FIG. 3 graphically illustrates some of the elements in an embodiment of the structure of a wireless communication protocol in accordance with the present invention.

FIG. 3 graphically illustrates an embodiment of a portion of a wireless protocol structure 55 as defined by the 802.11 specification. The 802.11 protocol is used as an example for explaining aspects of wireless protocols. Other wireless protocols may have similar constraints and generally have similar structures although the content and relative placements may vary. For clarity of the explanation, structure 55 illustrates a previous frame 56 representing a frame that previously was transmitted on a wireless channel, a current frame 57 representing a frame that is currently being transmitted on the wireless channel, and a next frame 54 representing a frame that could be transmitted following current frame 57. Some of the frame elements required by a wireless protocol are graphically illustrated by current frame 57. All of these frame elements are also required in previous frame 56 and next frame 54.

Communication over a wireless channel presents unique synchronization and coding problems not encountered with wire-base networks. One way these are manifested is in the synchronization portion of the preamble of each transmission. Each frame of structure 55 has two main portions, a Physical Layer Convergence Protocol (PLCP) and a MAC Protocol Data Unit (MPDU). The MPDU contains data in a data field 58, and also includes address/control information, and a CRC block. The PLCP contains a preamble 59 that is used for various functions. The PLCP also includes a header that supplies information about the fields that follow in the MPDU including the encoding scheme used for the transmission. The PLCP preamble generally is 144 bits long and is transmitted at a one Mbit per second data rate (1 Mbit/sec.) It should be noted that in some cases, the PLCP header can be as short as 72 bits, thus, system 30 must be able to respond in the time provided by the short 72 bit PLCP header.

Although the PLCP header generally is transmitted at one Mbit/sec., the MPDU is transmitted at a data rate that is specified in the PLCP header. Thus, the data rate can vary during a transmission. Wireless computer system 30 transfers the information from system memory to the wireless hardware section at a sufficient speed to support the various data rates.

Protocol structure 55 also includes an interframe spacing (IFS) that is a time period between frames on the wireless channel. The time period of the IFS is variable based on channel sensing back-off algorithms, but has a minimum time of about ten micro-seconds (referred to as a short IFS). In a wireless protocol the time between frames becomes important in order to maintain maximum utilization of the channel's bandwidth. Consequently, data must be available and must be transmitted at the required rate and each frame must be transmitted within a maximum allowed time, otherwise, error conditions can slow the channel's throughput.

Because of the characteristics of wireless communications, more than one station may simultaneously attempt a transmission and cause collisions on the wireless channel. 802.11 allows periods of time when such transmission may occur. These time periods are referred to as contention periods (CP). 802.11 also defines periods where such transmission is not permitted. These time periods are referred to as contention free periods (CF). During a CF period, a wireless system may transmit multiple information for multiple receiving stations in one transmission. For example, a transmitting station may send a message that one receiving station uses a part of as a control message and that another receiving station uses other portions of as data. Such a transmission is referred to as a two transmission sequence or multiple transmission sequence. One example of such a multiple transmission sequence is described by 802.11 as a CF-ACK plus data. As will be seen in the description of FIGS. 4 and 5, wireless computer system 30 is formed to provide for such multiple transmission sequences. These multiple transmission sequences maximize throughput and bandwidth utilization.

Those skilled in the art will understand that a station is generally another wireless entity outside of wireless computer system 30 to which wireless computer system 30 is communicating, such as another wireless computer system. The 802.11 protocol structure is used as an example of a general wireless protocol. Wireless computer system 30 can support operation using various different wireless protocols that have some similar characteristics to 802.11.

Returning to the description of FIG. 2, wireless computer system 30 includes a host portion or host system 31, illustrated by a dashed box, and a wireless hardware section or wireless H/W 40. Host system 31 includes a host processor 32 that is coupled to a system controller 33 that may be similar to controllers commonly referred to as a North Bridge controller. System controller 33 generally interfaces host processor 32 to a system memory 36 and a display device such as a graphics display. Host system 31 can also include an I/O controller 34 that may be similar to controllers often referred to as a South Bridge. I/O controller 34 typically has a PCI bus 37 through which I/O devices are interfaced to host system 31 and to host processor 32.

In most systems that are similar to wireless computer system 30, the system software that executes on host system 31 is divided into two levels of abstraction, operating software and device driver software. Device driver software or the device driver generally is software that executes on host system 31 and that controls the operation of wireless H/W 40 and provides a software link between wireless H/W 40 and the operating software of host system 31. Operating software typically refers to any software that is at an abstraction level higher than a device driver and includes operating system and application software. Typical device driver software is well understood by those skilled in the art. The distinction between operating software and device driver software is made merely for simplicity and clarity of the following descriptions and is not a limitation of the inventions contained herein. Other embodiments may have other software partitioning and may even include the driver software in the operating software.

Wireless computer system 30 minimizes the complexity and costs of wireless H/W 40 by partitioning the tasks that are performed at the MAC layer of the wireless communication protocol between wireless H/W 40 and host system 31. As will be explained in more detail in following descriptions, wireless computer system 30 is formed to use a S/W frame queue (see FIG. 4) in system memory 36 for storing information that is to be transmitted along with control information that is use in forming control portions of the transmitted frame. Also, wireless computer system 30 is formed to overlap sending or transmitting a first portion of a frame onto the wireless channel while a second portion of the frame is downloaded from the S/W frame queue into wireless H/W 40 thereby masking bus latencies of system 30 and particularly the latencies of PCI Bus 37. Masking the bus latencies is important in providing system 30 time to download sufficient portions of the S/W frame queue from system memory to permit the transmission process to continue to successful completion. Wireless computer system 30 utilizes the time during which the first portion of the transmit frame, such as at least a portion of the preamble, is transmitted in order to transfer or copy or download information from system memory 36 into wireless H/W 40 so that the information or a portion of the information from system memory 36 can be transmitted. Consequently, wireless computer system 30 is formed to partition the wireless tasks so that a first portion of a task is performed by host system 31 and a second portion is performed by wireless H/W 40. In the preferred embodiment, the first portion of the frame is an 802.11 PLCP preamble (see FIG. 3) and the second portion is information stored in the S/W frame queue (see FIG. 5 description) that is formed in system memory 36. Wireless computer system 30 is also formed to partition wireless functions into different types of tasks. Wireless computer system 30 forms task differentiated frame queues for each type of task and the various task differentiated frame queues are formed in different system areas based on the task. As will be seen in descriptions that follow, wireless computer system 30 partitions tasks into at least time-critical and non-time-critical tasks, and preferably into time-critical, non-time-critical, and network-critical tasks. Wireless computer system 30 forms information for some of the task differentiated frame queues in hardware frame queues or H/W frame queues in wireless H/W 40, forms information for some of the task differentiated frame queues in software frame queues or S/W frame queues in system memory 36, and forms information for another portion of the task differentiated frame queues in both a S/W frame queue and in a H/W frame queue. As will be seen hereinafter, a S/W frame queue typically is formed as a linked list having a number of S/W queue elements that contain pointers indicating the location of the next S/W queue element in the linked list that forms the S/W frame queue. Linked list queues are well known to those skilled in the art.

Which specific tasks are time-critical is determined by the amount of information to be processed in order to complete the task, the amount of time available to complete the task, and the amount of time required for the software of host system 31 to perform the task. The latency of host system 31 generally determines the amount of time for the software of host system 31 to perform the task, thus, the latency usually determines which tasks have to be classified as time-critical tasks for a particular system configuration. Time-critical tasks are generally initiated as the result of receiving control frames from the wireless channel because these generally require a response in the shortest amount of time. System 30 is formed to utilize the definiteness of the timing of the wireless protocol frame structure to perform tasks through PCI Bus 37 including the associated bus latency and to mask the bus latencies by the overlapped downloading. Thus, non-time-critical tasks are partitioned as those tasks that can be performed by the host processor through PCI Bus 37 and have a successful completion of the task in a certain percentage of attempts. The successful completion rate generally is in excess of approximately ninety-five percent (95%) and in the preferred embodiment is approximately at least ninety-nine percent (99%). In another embodiment, time-critical tasks are those tasks that can only be initiated in response to a received frame of a particular type and the time between completing reception of the received frame and initiating transmission of the responsive frame is no greater than the interframe spacing between the received frame and the responsively transmitted frame. (See description of FIG. 3)

In the preferred embodiment of wireless computer system 30, the latency requires that time-critical tasks include all transmissions that are defined by the 802.11 specification as control functions in addition to some defined as management functions. The preferred embodiment has a latency that generally is less than about six to ten micro-seconds (6-10 micro-sec.). Those skilled in the art will note that such latency can vary depending on the task being preformed. The preferred embodiment tasks that are partitioned as time-critical tasks include the 802.11 functions of transmitting frames having the following 802.11 acronyms: CTS, ACK, ATIM, Beacon, Probe request, PS (generating PS status for insertion into a frame), CF-ACK, CF-POLL, CF-POLL+CF-ACK CF-End, CF-End+CF-ACK, PS-POLL, Null Frame, and data frames sent in response to a PS-Poll (SIFS). This preferred embodiment of wireless computer system 30 generally forms information for time-critical tasks in H/W frame queues in wireless H/W 40 and the time-critical task is typically initiated by wireless H/W 40. It is recognized that other systems with less latency may have a different partitioning between the time-critical, nontime-critical, and network-critical tasks and may have fewer tasks partitioned as time-critical tasks. In most embodiments, at least one task will be a time-critical task.

Network-critical tasks are wireless functions for which it is desired to have a successful completion at the time specified by the protocol. Network-critical tasks must be responded to in order to keep the entire network operating properly. Wireless computer system 30 forms information for network-critical tasks in both S/W frame queues in system memory 36 and H/W frame queues in wireless H/W 40. The H/W frame queue for network-critical tasks contains a minimal set of information that enables the wireless network to continue functioning in the event that access to system memory 36 is blocked and the information from the S/W frame queue can not be downloaded from system memory 36. Since a H/W frame queue can always be transmitted, at least this response to a received frame or a network event (for example, a TBTT) will be sent. All the network-critical information in the H/W frame queue is accurate even though all the information that is in the S/W frame queue may not be included in the transmission from the H/W frame queue. In the preferred embodiment, network-critical tasks include the 802.11 tasks of transmitting a beacon, TSF, CF period, CF time remaining, DTIM period, and TIM. For example, a beacon is one example of a network-critical frame that must be responded to regardless of the latency of wireless computer system 30. For this example, a H/W frame queue for building and transmitting a beacon in response to receiving a TBTT can contain information for the beacon period, CF period, CF duration remaining, DTIM period, and TIM frame fields which are sufficient to respond to a TBTT event. Consequently, the preferred embodiment of wireless computer system 30 is formed to create a minimal subset of a beacon response in a H/W frame queue in order to form a minimal response and keep the network operating. The beacon H/W frame queue includes a complete beacon frame where only the TIM is conservatively set to be inactive for non-broadcast transmissions. Additionally, wireless computer system 30 is also formed to create a S/W frame queue containing a beacon response. The Beacon S/W frame queue contains designated TIM elements including all elements required for beacons carrying a TIM.

Non-time-critical tasks are those that can be performed by host system 31 within the latency time imposed by host system 31. Information for non-time-critical tasks is generally stored in a S/W frame queue and the non-time-critical tasks are initiated by operating and driver software in host system 31. Typically all frames relating to the 802.11 functions of fragmentation and defragmentation are assigned as non-time-critical tasks. In the preferred embodiment, the task of sending data frames is partitioned into a non-time-critical task category and the associated information is formed in a S/W frame queue in system memory 36. Data frames are those frames that primarily have a data payload (see FIG. 3). Also in the preferred embodiment, sending at least the frames defined by 802.11 as probe response, broadcast, multicast data, MGMT frames, CF-Poll, address to build CF-Poll without CF-ACK/DATA, multicast, request to send (RTS), and two transmission sequence frames are also partitioned into a non-time-critical task.

Referring still to FIG. 2, wireless H/W 40 includes a data path 53 and a MAC core 45 both of which are generally illustrated by a dashed box. Data path 53 includes a DMA/Buffer 46, a host interface 41, and a baseband interface 47. Host interface 41 is a typical PCI bus interface which facilitates enabling host system 31 to read and write various sections of wireless H/W 40. Host interface 41 has a PCI I/O port connected to PCI bus 37, and an internal I/O connected to a monitoring input of a snooper 52. DMA/Buffer 46 functions to make DMA transfers to and from system memory 36 and wireless H/W 40. To facilitate the DMA transfers, DMA/Buffer 46 has a DMA input connected to the internal output of host interface 41, and has a DMA output connected to an internal input of host interface 41. DMA/Buffer 46 also transfers transmission frames to baseband interface 47 and accepts received frames from baseband interface 47. DMA/Buffer 46 includes buffers for receiving information downloaded from system memory 36 during a transmission. The buffers provide timing tolerance to the latencies of PCI bus 37 and assist in masking the latencies. The buffers can be a variety of temporary storage elements that are well known to those skilled in the art and preferably are a FIFO buffers having storage capacity of about sixty-four bytes. In the preferred embodiment, DMA/Buffer 46 has four FIFO buffers for the half-duplex transmit and receive information. The FIFO buffers assist wireless H/W 40 to continue transmitting if bus latencies slow the download of information from system memory.

MAC core 45 includes, among other features, timing generation and sequencing logic that control the operation of wireless H/W 40. Preferably, the elements of MAC core 45 are formed as a finite state machine. Finite state machines are well known to those skilled in the art. Snooper 52 maintains status information relative to the present state of MAC core 45. Snooper 52 monitors both the transmit and receive traffic of the communication medium and records status information regarding the activity. In the preferred embodiment, snooper 52 has four register banks of about two hundred registers each in order to record all the relevant status information. The status information is used by a scheduler 50 and a prioritizer 43 to make decisions of what transmission action to initiate. For example, if a frame is transmitted and an ACK is not received, snooper 52 stores the status of sending the frame and later stores the status that an ACK was not received. This status is used to initiate a subsequent activity by wireless H/W 40. An output of snooper 52 is connected to an access input of scheduler 50 and to an input of prioritizer 43 in order to facilitate the status transfer. A statistics block 48 of MAC core 45 monitors transmission status, reception status, and channel status, to provide statistics information to other portions of wireless H/W 40 and host system 31. All transmitted frames either come from a S/W frame queue or from a H/W frame queue. For frames that are transmitted from S/W frame queues, scheduler 50 selects a S/W frame queue and presents location information and control data identifying the S/W frame queue to prioritizer 43. Based on the information sent from snooper 52, prioritizer 43 selects the highest priority transmission from either the transmission presented by scheduler 50 or other control and management transmissions that are waiting to be serviced from a H/W frame queue.

A frame composer 44 assists in forming all transmitted frames. For each transmission made by wireless H/W 40, frame composer 44 forms all of the transmission frames except for the preamble (see FIG. 3) which is formed by baseband processor 38. Frame composer 44 also builds or forms all the H/W frame queues and includes a hardware frames block or H/W frames 49 that contains H/W frame queue information for building each H/W frame queue. For transmitting from a S/W frame queue, frame composer 44 selects which type of preamble is to be transmitted and presents the preamble type to DMA/Buffer 46 which transfers the preamble type to baseband processor 38. Frame composer 44 also facilitates obtaining the information stored in the S/W frame queue and downloading it to wireless H/W 40 by passing the system memory location information from scheduler 50 through prioritizer 43 to DMA/Buffer 46. Additionally, frame composer 44 may modify the PLCP header information and other control information that is downloaded from a S/W frame queue. The modification is performed based on real-time information from statistics block 48 and snooper 52. For example, PLCP timing information and address information from the S/W frame queue may need to be modified based on real-time information from a previous reception or transmission such as the transmission rate may be different than that calculated by the operating system driver when building the S/W frame queue. Frame composer 44 obtains information from statistics block 48 and snooper 52, and modifies portions of a frame, such as the header information, with the real-time information obtained from statistics block 48. In the preferred embodiment, the following 802.11 fields may be modified by frame composer 44 based on real-time status information from statistics block 48: TSF field, CFP count, CFP duration remaining, PS, signal, service, PLCP length, duration, Addr 1, Addr 2, Addr 3, subtype, and sequence number. For example, frame composer 44 can change the PLCP rate and length fields of the header for different types of transmissions such as when performing a multiple transmission sequence, or change the address field in the header if a station has moved from one access point to another, or can change the power save bit in the header if the state of the station changes.

Scheduler 50 schedules a transmission from a S/W frame queue and presents information identifying the scheduled transmission to prioritizer 43. Scheduler 50 has a station table formed in storage locations within scheduler 50. The station tables store a set of station table entries for each station with which wireless computer system 30 communicates. The number of stations stored in the station table are selected to provide the system requirements desired for system 30. The contents of the station table can be swapped out and stored in system memory to facilitated communications with additional numbers of stations. Each set of entries in the station table contains information about a transmission for one station. The station table of scheduler 50 has entries for both CP and CF windows for each station. Scheduler 50 can be configured to mix and match CP and CF traffic in either window with programmable priority of CF verses CP traffic and can do so for each station individually. The station ID of each station is stored in one of the station table entries. The start address of the S/W frame queue is also stored into the station table entries. Using this relationship, the station table of scheduler 50 associates each entry in the station table and each S/W frame queue transmission with a particular station. The information in each set of station table entries comes from the S/W frame queues associated with a particular transmission to the particular station identified in the station ID entry. When scheduler 50 selects a station for a transmission, the set of station table entries for that station are presented to prioritizer 43. Consequently, scheduler 50 presents, among other elements, the S/W frame queue address to prioritizer 43. The station table entries are coupled to prioritizer 43 via the scheduler output of scheduler 50, and to host interface 41 through prioritizer 43 and DMA/Buffer 46.

Wireless H/W 40 also includes a timer 51 that provides timing signals to cooperate with other sections of wireless H/W 40 to facilitate controlling all of the sections of wireless H/W 40. Preferably, timer 51 is formed as a finite state machine. Finite state machines are well known to those skilled in the art. Timer 51 has a timing output that is connected to a timing input of each of scheduler 50, prioritizer 43, frame composer 44, statistics block 48, DMA/Buffer 46, baseband interface 47 and host interface 41. Scheduler 50 presents the S/W frame queue information to a scheduler output of scheduler 50 that is connected to a scheduler input of prioritizer 43. Prioritizer 43 has a priority output having signals that identify the next transmission and present the identity to frame composer 44 via a priority input of frame composer 44. Frame composer 44 processes the information provided on the priority input and forms transmission frames on a frame output that is connected to a frame input of DMA/Buffer 46. Statistics block 48 stores information about the successfulness of the station's channel transactions. Statistics block 48 keeps track of unsuccessful transmission attempts until a successful transmission or a final failure. Statistics block 48 also receives some information on a status input from a status output of baseband interface 47. A statistics output of statistics block 48 is connected to a statistics input of DMA/Buffer 46, to a statistics input of frame composer 44, and to a statistics input of prioritizer 43 to provide statistics/status information.

Baseband interface 47 has a data input connected to a data output of DMA/Buffer 46, and a data output connected to a data input of DMA/Buffer 46. Baseband interface 47 receives information to be transmitted from DMA/Buffer 46 via the data input. Baseband interface 47 receives information from DMA/Buffer 46 as parallel, preferably thirty-two bit wide, information and converts it to nibble wide for transmission to baseband processor 38 via a four bit input of baseband processor 38. Baseband interface 47 also provides parallel information to DMA/Buffer 46 from baseband processor 38 via a nibble output of baseband processor 38.

Figure 4:
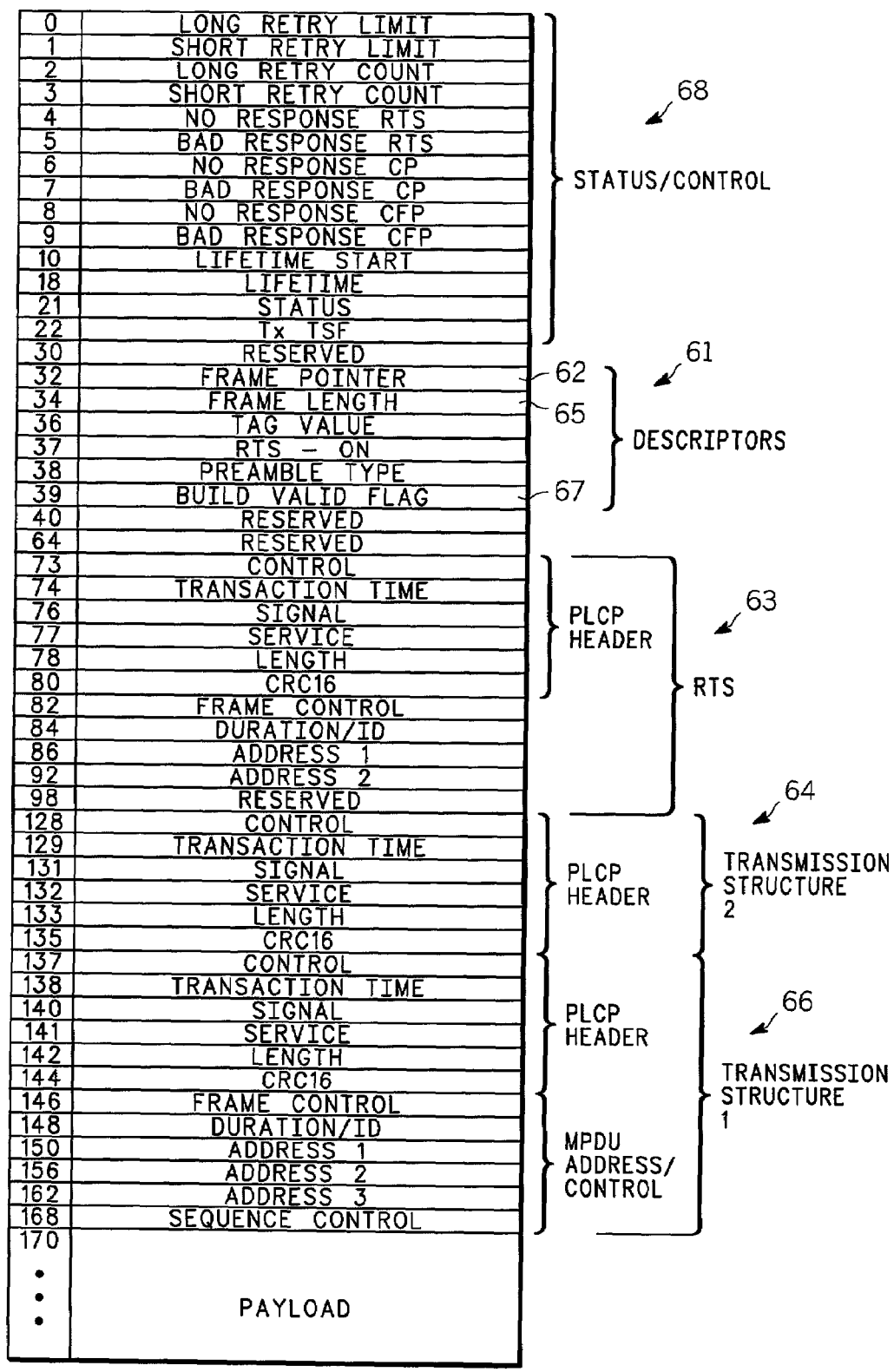
FIG. 4 is a tabulation schematically illustrating portions of an embodiment of a frame queue in system memory in accordance with the present invention.

FIG. 4 is a table graphically illustrating the structure and a portion of the type of information stored in an embodiment of a S/W frame queue structural element or S/W queue element 60 that is one element in a S/W frame queue of wireless computer system 30. The complete S/W frame queue is a linked list of a plurality of S/W queue elements 60 wherein each S/W queue element 60 points to the location of the next S/W queue element 60 in the complete S/W frame queue. It is recognized that implementations of wireless computer system 30 that have less latency may have a different partitioning of the exact structure of and the information contained in S/W queue element 60. For example, more tasks may be partitioned as non-time-critical tasks, thus, host system 31 may perform more tasks and S/W queue element 60 may contain more and different types of information. S/W queue element 60 is formed in system memory 36 (see FIG. 2) generally by the device driver that is running on host system 31. The following description of FIG. 4 contains several references to FIG. 2 because information stored in the S/W frame queue will be downloaded into wireless H/W 40, preferably into the station table of scheduler 50, in parallel with wireless H/W 40 transmitting the PLCP preamble of a transmit frame.

S/W queue element 60 has a status/control section or status/control 68 that includes status and control information which is used by both prioritizer 43 and frame composer 44 during a transmission sequence. Status/control 68 is used as a mailbox to pass information between S/W queue element 60 and H/W section 40. The download into prioritizer 43 and frame composer 44 occurs through snooper 52. After a transmission, information from statistics block 48 in wireless H/W 40 is uploaded into status/control 68. The transmission status information includes the status of a valid transmission or a failed transmission and other associated status information. Wireless H/W 40 uses this status information if a retransmission is required. The following entries are a part of status/control 68. Short and long retry limits are used to determine how often a frame is retried before it is retired, and are used by frame composer 44 in retransmitting the frame. RTS status information is included in the No Response and Bad Response status words. CP and CFP status words indicate that a response is being sent during either a CP or CF window and the information is used by statistics block 48. Lifetime status words indicate a particular frame is still eligible to be sent based on the lifetime of the frame. Tx TSF is used to set the lifetime.

A hardware descriptor section or descriptors 61 include a set of control information that is stored in the station table of scheduler 50 and is used for identifying a S/W frame queue for a transmission. Descriptors 61 include a frame pointer 62 that points to the address in system memory 36 of the starting address of the next S/W queue element 60 of the complete S/W frame queue. The next S/W queue element 60 stores information that is to be transmitted after transmission of the current S/W queue element 60 is complete. Several S/W queue elements 60 typically are required to store all the data that is to be transmitted as the result of a transmission request. Frame pointers 62 link each of S/W queue elements 60 together in a linked-list so that all the data in the complete S/W frame queue can be located and transmitted by wireless H/W 40. After a transmission is initiated, the linked-list ensures that frame information is ready for the next transmission and removes any need for the software of host system 31 to store information or data for the transmission. Thus, the linked-list assists wireless computer system 30 in using system memory 36 for storing data for transmission and removing the use of a dedicated microprocessor, ROM, and RAM in wireless H/W 40.

S/W queue element 60 also includes a frame length 65 that is used by the station table of scheduler 50 to determine the length of the next frame that is to be transmitted. A preamble type entry identifies the type of preamble being used. Generally this identifies either a long or short preamble and is used by baseband processor 38 to assist in generating the preamble. An RTS-ON flag indicates that an RTS is to be sent. A build valid flag 67 is set by the device driver software of host system 31 after the device driver has completed building all the information in S/W queue element 60. Build valid flag 67 is subsequently stored in the station table of scheduler 50 and is later used to indicate to prioritizer 43 that all the information is stored into S/W queue element 60 and that the information is ready for transmission.

S/W queue element 60 also includes a multiple transmission structure to support the multiple transmission sequence referred to in the description of FIG. 3. The PLCP header contains information about the encoding scheme and associated data rate that is used for a transmission. Selecting the encoding scheme/data rate defined in the PLCP header generally must be performed by hardware, thus, it would usually not be able to be determined by a download from the S/W frame queue. However, it can be shown that only two encoding schemes can apply at the same time, therefore, it is possible to pre-calculate each of the two and store each of them as part of the S/W frame queue. Both are downloaded into the wireless H/W section and the proper one is selected for transmission, and the PLCP header is modified by H/W section 40 accordingly for the scheme that is selected. The first structure generally has an arbitrarily selectable rate but preferably the highest rate in the operational rate set of the target station, while the second structure has to encode a rate in the basic rates, preferably the highest rate in the basic rate set.

A first transmission structure 66 generally is allocated to data transmissions. Information for sending the second information set in the multiple transmission sequence is stored in second transmission structure 64. First transmission structure 66 includes the PLCP header, MPDU address, and transmission data or TX data for a data transmission that can be completed during the transmission time. For the multiple transmission sequence, it is important to have the preamble, header, and other information ready for transmission in order to ensure the information is presented to wireless H/W 40 in time to send the information at the time required by the protocol and the channel speed. Forming the multiple transmission sequence information in S/W queue element 60 assists in ensuring that host system 31 can download the multiple transmission information in the amount of time required by wireless H/W 40 thereby removing the need to have a separate microprocessor along with associated RAM and ROM storage in wireless H/W 40. A multiple transmission sequence is discussed further in the description of FIG. 5.

For those cases where it is required to send an RTS with the transmission, S/W queue element 60 also includes information to support sending an RTS in an RTS section 63. RTS section 63 will be used by wireless H/W 40 to form a transmission frame that contains an RTS header using the information from RTS section 63, followed by a data header and the data that is stored further down in S/W queue element 60.

In the preferred embodiment, wireless computer system 30 forms two parallel sets of S/W frame queues, and all associated S/W queue elements 60, for each station transmitted to by wireless computer system 30. Since the preferred embodiment engages in transmissions with up to sixteen stations, host system 31 forms sixteen sets of SAW frame queues in system memory with each set having two SAW frame queues. One S/W frame queue element of the two has information for use during an 802.11 CF period, a second one of the two has information for use during an 802.11 CP period. Depending on the CP and CF priority assigned to a data frame that is to be transmitted, the driver software builds an entire linked-list S/W frame queue for either the CP or CF priority. The proper set is chosen by the combined outputs of scheduler 50 and prioritizer 43 when wireless H/W 40 starts a transmission. Scheduler 50 and prioritizer 43 make the choice based on the condition of the channel information that is stored in the station table of scheduler 50.

When S/W queue element 60 is downloaded into wireless H/W 40, descriptors 61 from S/W queue element 60 are stored into the station table entry for this transmission. Information from the start address, length, and RTS usage portions of S/W queue element 60 is stored into the corresponding locations of the station table. The station table also has sections to store information that is used for CF periods and to store information that is used during a CP period. Both the CF and CP sections contain locations designated as build valid, frame pointer, and frame length. These three locations are loaded with the information from the corresponding locations of the S/W queue element 60 for a CF period and the S/W queue element 60 for a CP period. Thus, the frame pointer, frame length, build valid flag, and RTS-on from the S/W frame queue that is designated as the CP and CF S/W frame queue is stored into the corresponding locations of the station table.

Figure 5:
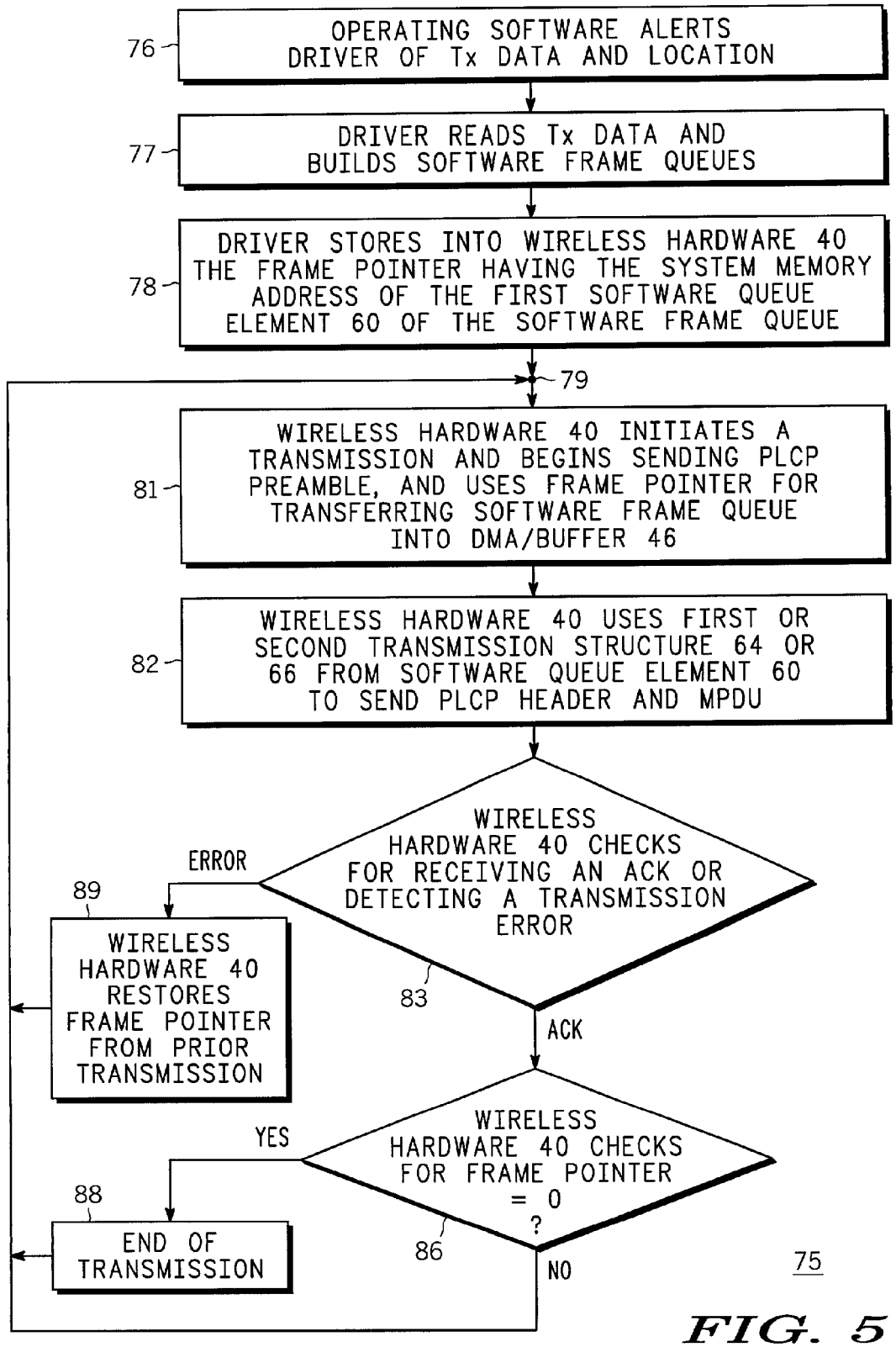
FIG. 5 is a functional flow chart illustrating some of the steps in an embodiment of a communication method in accordance with the present invention.

FIG. 5 is a high level flow chart 75 illustrating some of the high level functional steps in an embodiment of a method of forming wireless computer system 30. Flow chart 75 illustrates, among other things, some of the functional steps in transmitting the information in S/W queue element 60. It should be noted that in other embodiments, wireless computer system 30 may have different latency thus the partitioning of the task differentiated frame queues and the partitioning based on time-critical functions may have a different partitioning and flow chart 75 may have a different sequence than the particular sequence for this embodiment.

As illustrated in a step 76, the operating software of wireless computer system 30, preferably host system 31, typically receives a request to perform a task that requires a data transmission onto the wireless channel, for example application software needs to send an email. The operating software organizes the data that is to be transmitted or TX data into a series of memory locations, then passes a transmission request and an address of the TX data to the device driver that is running on host system 31. During a step 77, the device driver reads the TX data and prepares a plurality of S/W frame queues. In the preferred embodiment, two sets of S/W frames queues, each having at least one and preferably a plurality of S/W queue elements 60, are formed with each set forming a link-list linking one S/W queue element 60 in the set to the next via each frame pointer 62. The last S/W queue element 60 in the linked-list has a zero value stored in frame pointer 62 to indicate that it is the last S/W queue element 60 for the current transaction. The device driver stores the TX data into the payload section of the number of S/W queue element 60 that are required to hold all of the TX data, and then builds the remaining portion of each S/W queue element 60, including the multiple transmission sections. Build valid flag 67 is initially all zero's indicating that no information is yet available for this transmission. Frame pointer 62 and frame length 65 are built as required for the amount of Tx data and the location of each S/W queue element 60. After building all S/W queue elements 60 that are required to form this particular Tx data, the device driver builds the PLCP header and address/control information and stores it in the PLCP header section for transmission structure 66 for each S/W queue element 60. It is possible that a CF period multiple transmission opportunity may occur during a transmission time. In order to send a multiple transmission if such a condition arises, the driver builds the PLCP header and address/control information for both the first and second transmissions in a first transmission structure 66 and a second transmission structure 64. The driver looks at the statistics information from previous transactions on the communication channel to determine the transmission rate and header lengths to use in building each S/W queue element 60. After host system 31 forms the S/W frame queue by building all of the linked S/W queue elements 60, each build valid flag 67 in each S/W queue element 60 is set. As noted previously in the description of FIGS. 2 and 4, frame composer 44 may modify the pre-calculated transmission rates and header lengths based on real-time information gained from snooper 52 and statistics block 48 prior to initiating the transmission. Build valid flag 67 will be used by prioritizer 43 of wireless H/W 40 to determine if the current S/W queue element 60 is ready for transmission.

Referring to step 78, after setting all build valid flags 67, the device driver writes a first frame pointer or a starting frame pointer into wireless H/W 40, preferably into the station table of scheduler 50 (see FIG. 2). Preferably, the device driver stores the first frame pointer from the first S/W queue element 60 of the particular S/W frame queue and the associated frame length for the CP S/W frame queue and for the CF S/W frame queue into the corresponding station table entries for the destination station in the station table of scheduler 50. If this is a first transmission to the destination station, the driver will also store the station ID into the station table of scheduler 50. Scheduler 50 selects the starting frame pointer of either the CP or CF S/W frame queue from the station table of scheduler 50 depending on the status information provided by snooper 52 and timer 51. The starting frame pointer has the system memory address of the first frame queue element of the plurality of linked S/W queue elements 60 that were prepared by the device driver. A step 81 illustrates that when baseband processor 38 provides wireless H/W 40 a signal that the wireless channel is clear for transmission, timer 51 starts prioritizer 43 to check for available transmit frames.

After the device driver stores the frame queue starting pointers into scheduler 50 and set the built valid flag in the station table, scheduler 50 presents an entire station table entry to prioritizer 43. When the S/W frame queue priority is high enough, prioritizer 43 selects the scheduler information as the next transmission. Forming and sending the PLCP preamble for a transmission is a time-critical task that must be performed after receiving a frame or in response to completing the transmission of a frame. Frame composer 44 chooses the preamble type and sends the preamble type to DMA/Buffer 46. DMA/Buffer 46 transfers the PLCP preamble information to baseband processor 38 through baseband interface 47 as baseband processor 38 requests transmission information. As baseband processor 38 is beginning to build the preamble, prioritizer 43 selects a transmit frame. If it is a data frame, scheduler 50 selects either the CF or CP frame pointer presented by the station table and presents the selected starting frame pointer to frame composer 44. Frame composer 44 stores the starting frame pointer into DMA/Buffer 46. DMA/Buffer 46 uses the starting frame pointer as a start address to transfer or download, via a DMA transfer, the frame information from first S/W queue element 60 into wireless H/W 40. During the initial portion of the DMA transfer, wireless H/W 40 is still sending the PLCP preamble at the same time that the information in first S/W queue element 60 is downloading from system memory 36. Information from status/control 68 (see FIG. 5) is downloaded into the station table of scheduler 50 and then presented to prioritizer 43. Prioritizer 43 uses the information to determine the priority of the next transmission. After selecting a frame for transmission, frame composer 44 determines if it should change any of the PLCP header information that is subsequently downloaded from S/W queue element 60. Frame composer 44 uses the frame type information and information from snooper 52 to assist in making the determination. H/W descriptors 61 are downloaded in the station table of scheduler 50 for use in locating the next S/W queue element 60. The information in RTS section 63, second transmission structure 64, and at least the PLCP header of first transmission structure 66 are all downloaded into the station table of scheduler 50 via DMA/Buffer 46. Timer 51 generates the timing and control required to facilitate transferring the information to the respective locations in scheduler 50 and to complete the download.

A step 82 illustrates that as the PLCP preamble transmission completes, wireless H/W 40 begins sending the PLCP header from first transmission structure 66 (see FIG. 4) that was just downloaded into DMA/Buffer 46. If the transmission included an RTS frame or if it was a multiple transmission sequence, wireless H/W 40 would transmit the information downloaded from RTS section 63 or second transmission structure 64 as required. In some cases, the information built into the PLCP header may no longer be correct, thus, frame composer 44 may change the information in portions of any of the PLCP headers based on the latest statistic/status information provided to prioritizer 43 by statistics block 48. Generally, transmit frames are longer than the size of the FIFOs of DMA/Buffer 46, thus, all of the contents of S/W queue element 60 are not downloaded while the preamble is transmitted. In such a case, the downloading of S/W queue element 60 continues in parallel with the transmissions until all of S/W queue element 60 is downloaded. Because each PLCP preamble type is always the same length and is always transmitted at the same data rate (see the description of FIG. 3), wireless computer system 30 always has a set amount of time to start the download of at least a portion of the S/W frame queue to wireless H/W 40. This sequence of operations assists in masking the bus latencies of system 30, and particularly the latencies of PCI bus 37.

The method of overlapping the downloading of transmission frame information during transmission continues for the other S/W queue elements 60 of the S/W frame queue that are linked to the previous transmission. Frame pointer 62 that was downloaded during the transmission, or the second frame pointer, points to the next S/W queue element 60 in system memory 36 that is to be transmitted. This second frame pointer 62 is stored into the same station table locations of scheduler 50 as the first frame pointer. Additionally, the previous frame pointer (the first or starting frame pointer) was also saved in DMA/Buffer 46, along with the transmitted frame, in case the just completed transmission has an error.

Step 83 illustrates that wireless H/W 40 checks, via information from baseband processor 38, for receiving an ACK in response to the transmitted information or for detecting an error condition. Step 84 illustrates that if an error condition is detected, such as an ACK is not received or an error is received or the 802.11 timeout occurs, the status information of that error is uploaded to system memory 36 and stored into status/control 68 of the S/W queue element 60 that was in error. Then DMA/Buffer 46 uses the previous frame pointer (first frame pointer) and branches to re-entry point 79 to reinitiate the previous sequence of sending the PLCP preamble and downloading the first S/W queue element 60 into DMA/Buffer 46. If wireless H/W 40 receives an ACK, the status information is uploaded into status/control 68 of the transmitted S/W queue element 60 and the method continues. At step 86, scheduler 50 checks the frame pointer for an all zero condition which is used to indicate that the previous S/W frame queue was the last one for this transmission sequence. If the frame pointer is not all zero's, the method branches to re-entry point 79 and frame composer 44 initiates another transmission sequence using the frame pointer 62 that was downloaded (second frame pointer) in the last download sequence and stored into the station table of scheduler 50. Since the S/W frame queues are a linked-list, wireless H/W 40 can always locate the next S/W queue element 60 of the S/W frame queue regardless of the number of S/W queue elements 60 required for the transmission. This sequence repeats until the downloaded frame pointer is all zero's indicating the end of the transmission sequence as shown by step 88.

For a time-critical transmission, frame composer 44 builds the entire frame using the H/W frame information in H/W frames 49. For each type of time-critical transmission, H/W frames 49 has information necessary to build the proper PLCP and MPDU sections including the PLCP header. Typically, the information for each time-critical frame is very similar and can be easily formed by a small finite state machine.

Received frames enter wireless computer system 30 via RF front-end 39 where the RF signal is demodulated to baseband signal and sent to baseband processor 38. Baseband processor 38 decodes the digital signals from the coded baseband signal and sends the digital information to baseband interface 47 which checks for valid frames. Upon receiving a valid data frame, snooper 52 extracts the PLCP header and stores portions of it for status and DMA/Buffer 46 uploads the MPDU to a received frame queue in system memory 36. Upon receiving a valid frame requiring a time-critical transmission, for example a CTS, snooper 52 detects the reception of the frame requiring a control frame response, timer 51 initiates a response, prioritizer 43 selects the CTS, frame composer 44 sends the required H/W frame queue to DMA/Buffer 46, and initiates a transmission from DMA/Buffer 46.

Figure 6:
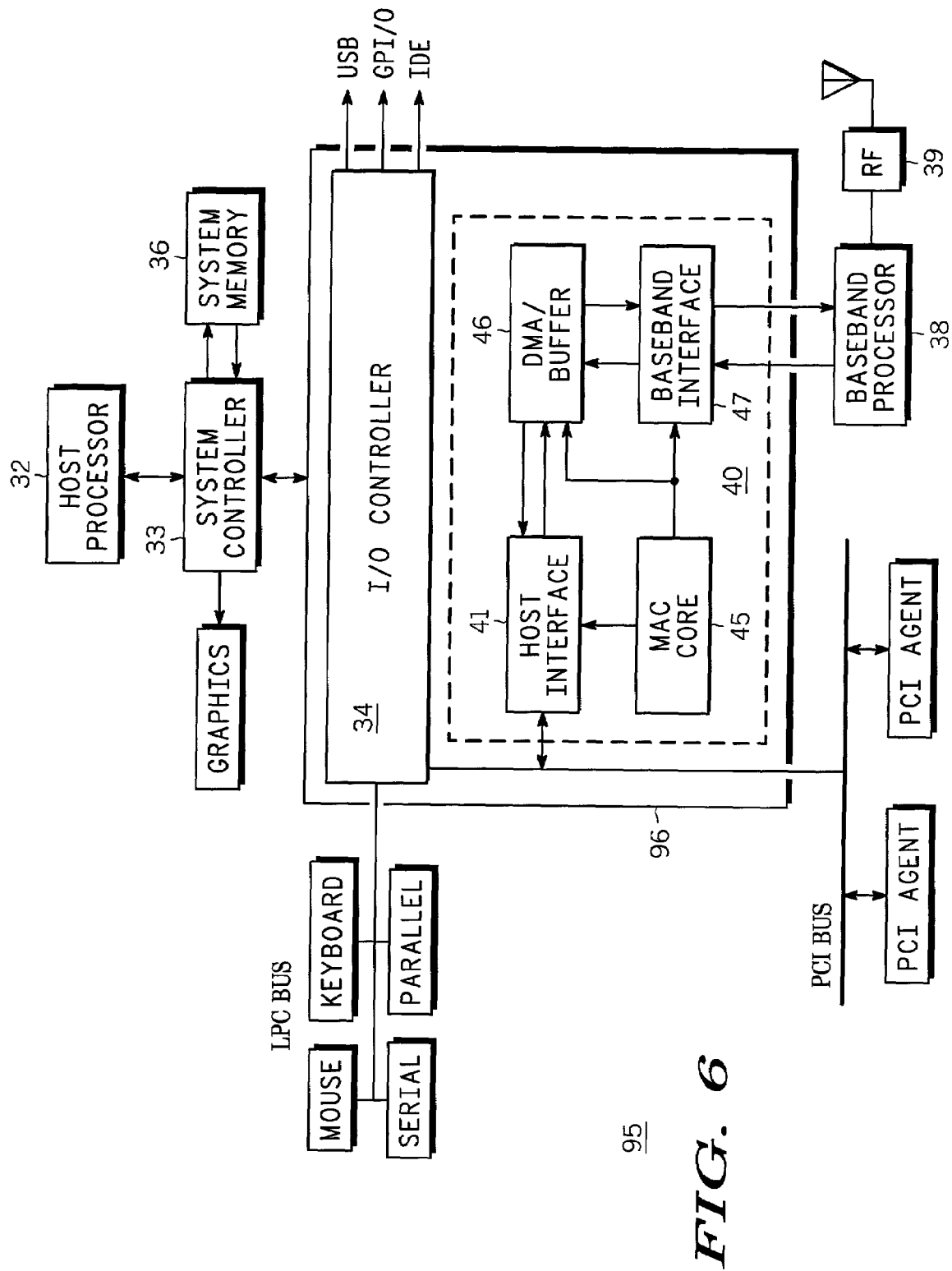
FIG. 6 schematically illustrates a functional diagram of another wireless computer system that is an alternate embodiment of the wireless computer system of FIG. 2 in accordance with the present invention.

FIG. 6 schematically illustrates a functional diagram of an embodiment of a wireless computer system 95 that is an alternate embodiment of wireless computer system 30 illustrated in FIG. 2. Wireless computer system 95 has an integrated I/O controller 96 that includes both wireless H/W 40 and I/O controller 34 (see FIG. 2) integrated onto a single monolithic semiconductor die. I/O controller 34 typically occupies a very large semiconductor die while wireless H/W 40 can be a small semiconductor die and is usually less than about one-fifth the area required for I/O controller 34. Forming I/O controller 34 and wireless H/W 40 on a monolithic semiconductor die beneficially results is a lower total cost and also a die area savings. Die area is reduced from various sources such as requiring fewer interconnections and many driver devices can have a smaller size because output loading is reduced. Consequently, forming wireless H/W 40 and I/O controller 34 on one semiconductor die beneficially results in a semiconductor die that is only slightly larger than the semiconductor die of I/O controller 34 alone. Typically the semiconductor die for integrated I/O controller 96 is less than about thirty percent larger (30%) and preferably is less than about twenty percent (20%) larger than the semiconductor die of I/O controller 34 alone.

Figure 7:
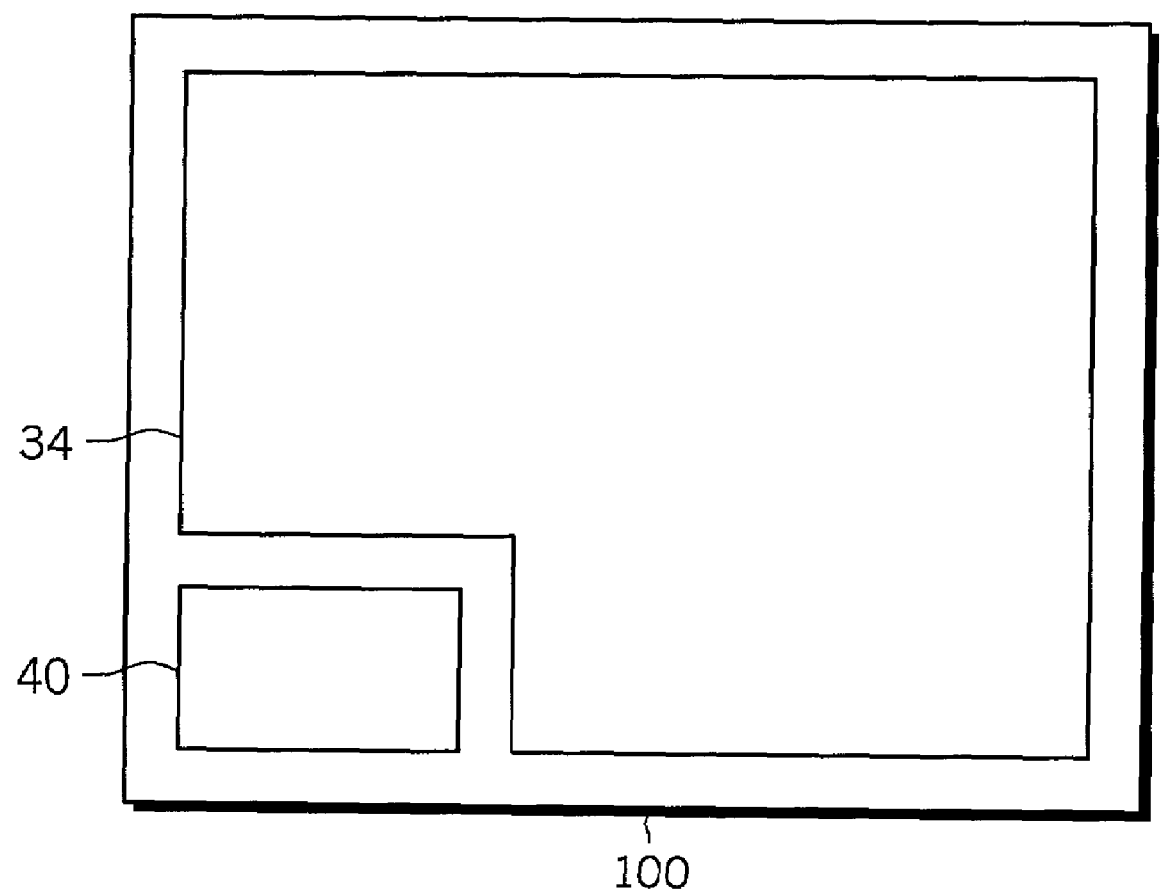
FIG. 7 is an enlarged plan view of an embodiment of a semiconductor die that includes a wireless computer system in accordance with the present invention.

FIG. 7 schematically illustrates a plan view of a semiconductor die 100 illustrating an embodiment of the semiconductor die of integrated I/O controller 96. Semiconductor die 100 has I/O controller 34 formed on a first area of semiconductor die 100 and wireless H/W 40 formed on a second area of semiconductor die 100.

While the invention is described with specific embodiments, it is evident that many alternatives and variations will be apparent to those skilled in the art. For purposes of clarity of the explanation, an embodiment of a wireless computer system that implements an 802.11 WLAN is used as an example in order to describe embodiments of the wireless computer system. However, as will be understood by one skilled in the art, the invention is applicable to other wireless computer systems and networks in addition to 802.11 wireless networks. More specifically the invention has been described for a wireless computer system having a particular latency. Systems having different latency may use a different partitioning of tasks for time-critical and non-time-critical tasks, may use a different structure for the task differentiated frame queues, and may use a different partitioning for wireless H/W 40. Further, those skilled in the art will realize that the host system may be much less complex than host system 31, as long as the host system has a memory and can built the s/w frame queues.

By now it should be appreciated that there has been provided a novel way to form a wireless computer system and the associated task differentiated frame queues. Forming the wireless computer system to map variable non-time-critical information and store transmission data and portions of the transmit frame information in system memory reduces the need for a dedicated microprocessor with the associated RAM and ROM. Overlapping the sending of a first portion of a transmit frame while downloading a second portion of the transmit frame from system memory assists in ensuring that the transmit frame information is available when needed for transmission, assists in masking bus latencies, and also assists in reducing the system costs and power dissipation. Transmitting the first portion while the second portion is downloading masks bus latencies that are involved in the downloading. Masking the latencies is important is providing system 30 time to download sufficient portions of the S/W element 60 from system memory to permit the process to continue to successful completion.

The invention claimed is:

1. A method of forming a transmit frame for communication over a wireless LAN having latency masking comprising:
    forming the wireless LAN to operate with a computer system having a host system and a wireless section wherein the host system has a system memory;
    forming the wireless section to generate a first portion of the transmit frame;
    forming the host system to build a second portion of the transmit frame in the system memory, wherein this forming includes forming the host system to build a software frame queue having at least two physical layer convergence protocol (PLCP) header sections for at least two different encoding schemes; and
    forming the wireless section to initiate transmitting the first portion of the transmit frame onto a wireless channel and to initiate transferring the second portion of the transmit frame from the system memory into the wireless section.

2. The method of claim 1 further including forming the wireless section to select one PLCP header section of the at least two PLCP header sections.

3. In a wireless computer system having a host portion and a wireless section, wherein the host portion has a system memory, a method comprising:
    generating a first portion of a transmit frame in the wireless section;
    building a second portion of the transmit frame in the system memory;
    wirelessly transmitting the first portion of the transmit frame on a wireless network;
    concurrent with the wirelessly transmitting, transferring the second portion of the transmit frame from the system memory to the wireless section;
    further building a first part of a network-critical task in the wireless section; and
    further building a second part of the network-critical task in the host portion, and wherein the second part includes at least a portion of the first part.

4. The method as recited in claim 3 wherein building the second portion of the transmit frame comprises storing the second portion in a link-list frame queue in the system memory.

5. In a wireless computer system having a host portion and a wireless section, wherein the host portion has a system memory, a method comprising:
    generating a first portion of a transmit frame in the wireless section;
    building a second portion of the transmit frame in the system memory;
    wirelessly transmitting the first portion of the transmit frame on a wireless network; and
    concurrent with the wirelessly transmitting, transferring the second portion of the transmit frame from the system memory to the wireless section, wherein building the second portion of the transmit frame in the system memory includes generating at least two physical layer convergence protocol (PLCP) header sections for at least two different encoding schemes.

6. The method as recited in claim 5 further comprising selecting one PLCP header section of the at least two PLCP header sections in the wireless section.

7. An apparatus comprising:
    a host interface configured to communicate with a host, wherein the host includes a system memory; and
    circuitry coupled to the host interface and configured to generate a first portion of a transmit frame and wirelessly transmit the first portion on a wireless network; wherein the system memory stores a remaining portion of the transmit frame during the generation of the first portion, and wherein the circuitry is configured to communicate through the host interface to transfer the remaining portion from the system memory concurrent with wirelessly transmitting the first portion, and wherein the remaining portion includes at least a sub-portion of the first portion.

8. The apparatus as recited in claim 7 wherein the circuitry is further configured to wirelessly transmit the remaining portion subsequent to the first portion.

9. An apparatus comprising:
    a host interface configured to communicate with a host, wherein the host includes a system memory; and
    circuitry coupled to the host interface and configured to generate a first portion of a transmit frame and wirelessly transmit the first portion on a wireless network; wherein the system memory stores a remaining portion of the transmit frame during the generation of the first portion, and wherein the circuitry is configured to communicate through the host interface to transfer the remaining portion from the system memory concurrent with wirelessly transmitting the first portion, and wherein the remaining portion of the transmit frame in the system memory includes at least two physical layer convergence protocol (PLCP) header sections for at least two different encoding schemes.

10. The apparatus as recited in claim 9 wherein the circuitry is configured to select one PLCP header section of the at least two PLCP header sections in the wireless section for wireless transmission.

11. A computer system comprising:
    a host portion comprising a system memory; and
    a wireless section coupled to the host portion, wherein the wireless section is configured to generate a first portion of a transmit frame in the wireless section, and wherein the system memory is configured to store a second portion of the transmit frame in the system memory, and wherein the wireless section is configured to wirelessly transmit the first portion of a transmit frame on a wireless network and to concurrently transfer the second portion of the transmit frame from the system memory to the wireless section, and wherein the wireless section is further configured to build a first part of a network-critical task, and wherein a second part of the network-critical task is stored in the system memory, and wherein the second part includes at least a portion of the first part.

12. The computer system as recited in claim 11 wherein the second portion of the transmit frame is stored in a link-list frame queue in the system memory.

13. A computer system comprising:
a host portion comprising a system memory; and
a wireless section coupled to the host portion, wherein the wireless section is configured to generate a first portion of a transmit frame in the wireless section, and wherein the system memory is configured to store a second portion of the transmit frame in the system memory, and wherein the wireless section is configured to wirelessly transmit the first portion of a transmit frame on a wireless network and to concurrently transfer the second portion of the transmit frame from the system memory to the wireless section, and wherein the second portion of the transmit frame includes at least two physical layer convergence protocol (PLCP) header sections for at least two different encoding schemes.

14. The computer system as recited in claim 13 wherein the wireless section is configured to select one PLCP header section of the at least two PLCP header sections.

\* \* \* \* \*